(12) United States Patent
Haruna (10) Patent No.: US 10,785,411 B2
(45) Date of Patent: Sep. 22, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kohta Haruna, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/453,707

(22) Filed: Jun. 26, 2019

(65) Prior Publication Data

US 2020/0007766 A1    Jan. 2, 2020

(30) Foreign Application Priority Data

Jun. 27, 2018   (JP) ................. 2018-122356

(51) Int. Cl.
*H04N 5/228*   (2006.01)
*H04N 5/232*   (2006.01)
*H04N 5/343*   (2011.01)
*H04N 5/225*   (2006.01)

(52) U.S. Cl.
CPC ......... *H04N 5/23245* (2013.01); *H04N 5/343* (2013.01); *H04N 5/2254* (2013.01)

(58) Field of Classification Search
CPC ... H04N 5/23245; H04N 5/343; H04N 5/2254
USPC ...................................... 348/222.1
See application file for complete search history.

(56) References Cited

U.S. PATENT DOCUMENTS

2011/0025871 A1* 2/2011 Yoshioka ........... H04N 5/35581
                                                           348/222.1

FOREIGN PATENT DOCUMENTS

JP         2003-134368 A    5/2003

* cited by examiner

*Primary Examiner* — Usman A Khan
(74) *Attorney, Agent, or Firm* — Cowan, Liebowitz & Latman, P.C.

(57) ABSTRACT

An image processing apparatus comprises a processor capable of setting a first mode of outputting image data corresponding to a first region of an image sensor including a plurality of pixels, and a second mode of outputting image data corresponding to a second region that is smaller than the first region, and selecting one of a plurality of sizes at least including first, second and third sizes as an output size for image data. The second size is based on the first size, and if the first mode is set, the first, second and third sizes are included as choices of size from which the processor selects, and if the second mode is set, the first and third sizes, excluding the second size, are included as the choices of size.

13 Claims, 8 Drawing Sheets

| SIZE | NUMBER OF PIXELS | LATERAL WIDTH × VERTICAL WIDTH (PIXELS) |
|---|---|---|
| L | 30M | 6720x4480 |
| M | 13M | 4464x2976 |
| S1 | 7.5M | 3360x2240 |
| S2 | 3.8M | 2400x1600 |

FIG. 3B

| SIZE | NUMBER OF PIXELS | LATERAL WIDTH × VERTICAL WIDTH (PIXELS) |
|---|---|---|
| L | 12M | 4176x2784 |
| M | | |
| S1 | | |
| S2 | 3.8M | 2400x1600 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and storage medium.

Description of the Related Art

Conventionally, in some types of digital cameras, among means for storing still images obtained by reading out signals from an image sensor, such as a CCD sensor or a CMOS sensor, and electrically converting the signals to digital data, there is means capable of selecting a size of the still images from various recording sizes. Generally, the largest recording size (which will be hereinafter referred to as "L size") coincides with the data size of an image obtained in the case of reading out image data from every pixel that constitutes the image sensor. Based on the L size serving as a reference, a recording size (which will be hereinafter referred to as "M size") obtained by reducing the L size to two-thirds or three-fourths, and a recording size (which will be hereinafter referred to as "S1 size") obtained by halving the L size are provided as options. There are also cases where the smallest recording size (which will be hereinafter referred to as "S2 size") that does not depend on the number of pixels in the image sensor can also be selected. The S2 size corresponds to 2400×1600 pixels, for example, and is generally used standardly in web material. Since the S2 size does not depend on the number of pixels in the image sensor, still images of the same number of pixels are obtained even if these images are shot with various digital cameras, and time and effort to edit the number of pixels later are thus saved. Note that the recording size can be selected not only on the digital camera body but also from a PC, a smartphone, or the like that remotely controls the digital camera.

Japanese Patent Laid-Open No. 2003-134368 describes a technology for enabling image data to be recorded with a resolution that is favorable for each recording media in a digital camera capable of recording image data in a plurality of recording media. According to this technology, a similar number of still images can be recorded in media with different recording capacities. Thus it is significantly advantageous for a user that a plurality of recording sizes are selectable.

Here, if different lenses can be attached to a digital camera, the size of the image circle on the image sensor may differ depending on the lens. If the image circle is smaller than the image sensor, light does not reach a region of the image sensor outside the image circle, and a peripheral portion of the image becomes dark. To obtain an image in which the peripheral portion is not dark, only a region that is included in the image circle needs to be cropped. In this case, since the number of effective pixels in the image sensor is limited by the size of the image circle, the angle of view of a read image is narrowed, the number of pixels that constitute the image also decreases, and accordingly, the L size also becomes small. In this case, the M size and the S1 size, which are sizes obtained by reducing the L size serving as a reference, also become small similarly. However, the S2 size does not depend on the number of pixels in the image sensor, and the M size and the S1 size may then become smaller than the S2 size. Thus, there are cases where the S2 size, which is to be the smallest recording size, is not the smallest recording size, which may confuse the user.

SUMMARY OF THE INVENTION

The present invention has been made in consideration of the above situation, and allows the user to select a favorable recording size regardless of the difference in the angle of view.

According to the present invention, provided is an image processing apparatus comprising: a processor capable of setting a first mode of outputting image data corresponding to a first region of an image sensor including a plurality of pixels, and a second mode of outputting image data corresponding to a second region that is smaller than the first region, and selecting one of a plurality of sizes at least including a first size, a second size, and a third size, as an output size for image data, wherein if the first mode is set, the first size, the second size, and the third size are included as choices of size from which the processor selects, and if the second mode is set, the first size and the third size, excluding the second size, are included as the choices of size, if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected, if the second mode is set, image data output in a case where the third size is selected is image data obtained by reducing a number of pixels of image data output in a case where the first size is selected, a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

Further, according to the present invention, provided is an image processing method comprising: selecting one of a plurality of sizes at least including a first size, a second size, and a third size, as an output size for image data, while it is possible to set a first mode of reading out image data corresponding to a first region of an image sensor including a plurality of pixels, and a second mode of reading out image data corresponding to a second region that is smaller than the first region, wherein if the first mode is set, the first size, the second size, and the third size are included as choices of size from which a size is selected, and if the second mode is set, the first size and the third size, excluding the second size, are included as the choices of size, if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected, if the second mode is set, image data output in a case where the third size is selected is image data obtained by reducing a number of pixels of image data output in a case where the first size is selected, a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

Furthermore, according to the present invention, provided is a non-transitory storage medium readable by a computer, the storage medium storing a program that is executable by the computer, wherein the program includes program code for causing the computer to function as an image processing apparatus comprising: selecting one of a plurality of sizes at least including a first size, a second size, and a third size, as an output size for image data, while it is possible to set a first mode of reading out image data corresponding to a first region of an image sensor including a plurality of pixels, and a second mode of reading out image data corresponding to a second region that is smaller than the first region, wherein if the first mode is set, the first size, the second size, and the third size are included as choices of size from which a size is selected, and if the second mode is set, the first size and the third size, excluding the second size, are included as the choices of size, if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected, if the second mode is set, image data output in a case where the third size is selected is image data obtained by reducing a number of pixels of image data output in a case where the first size is selected, a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1A:
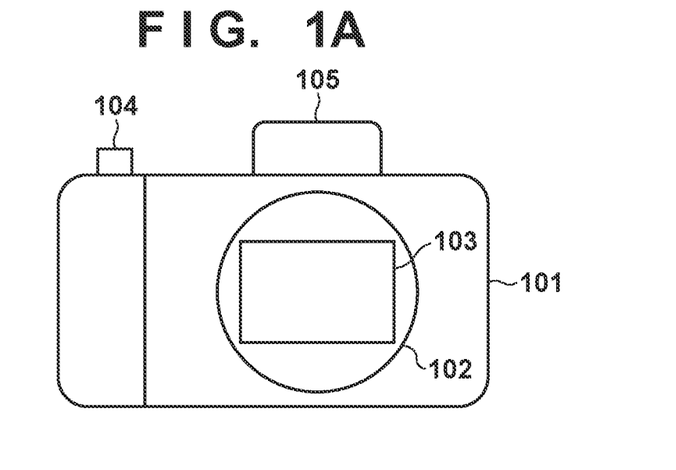
FIGS. 1A to 1C show an example of an external appearance of a digital camera according to embodiments of the present invention.
Figure 1B:
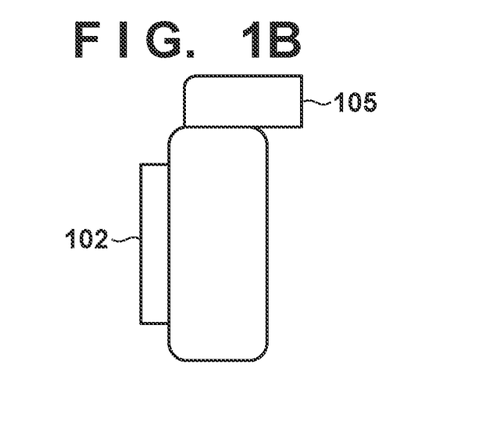
Figure 1C:
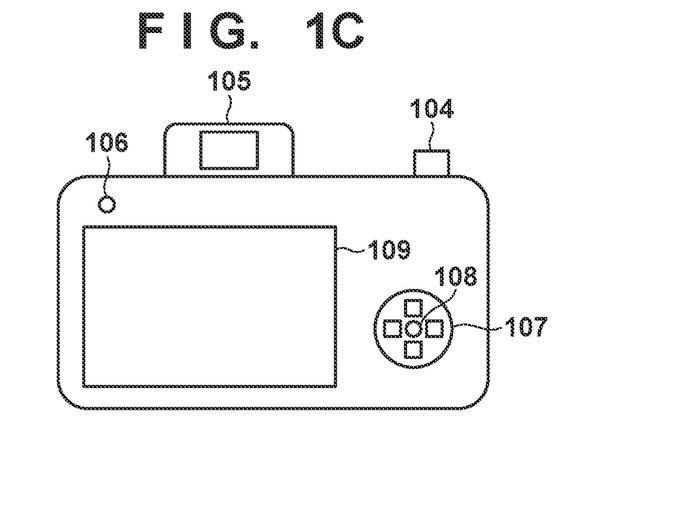

FIGS. 1A to 1C show an example of an external appearance of a digital camera, which serves as an image capturing apparatus according to the first embodiment of the present invention. FIG. 1A is a front view, FIG. 1B is a side view, and FIG. 1C is a back view. In FIGS. 1A to 1C, a camera body 101 includes a lens mount 102, an image sensor 103, a release button 104, an electronic view finder 105, a menu display button 106, a four-direction button 107, a set button 108 for selecting a menu item, and a back LCD 109. Note that, in this embodiment, the image sensor 103 is a full-size sensor with a 3:2 aspect ratio, and contains 30 M pixels. A removable interchangeable lens for a full-size sensor can be attached to the lens mount 102.

Next, an image capture operation of the digital camera that has the above configuration will be described. If an interchangeable lens (not shown) is attached to the lens mount 102, and the release button 104 is pressed with the camera body 101 oriented toward an object, a control microcomputer (not shown) controls the interchangeable lens that is attached via the lens mount 102, and the object is brought into focus. Also, photometry is performed using an image formed on the image sensor 103, and the shutter speed, aperture, and sensitivity are determined so as to obtain an optimum brightness. Then, shooting is performed using these control values. Image signals read out from the image sensor 103 are processed into a digital image (image data) by a later-described image processor 201, and are recorded in a media such as an SD card.

Figure 2:
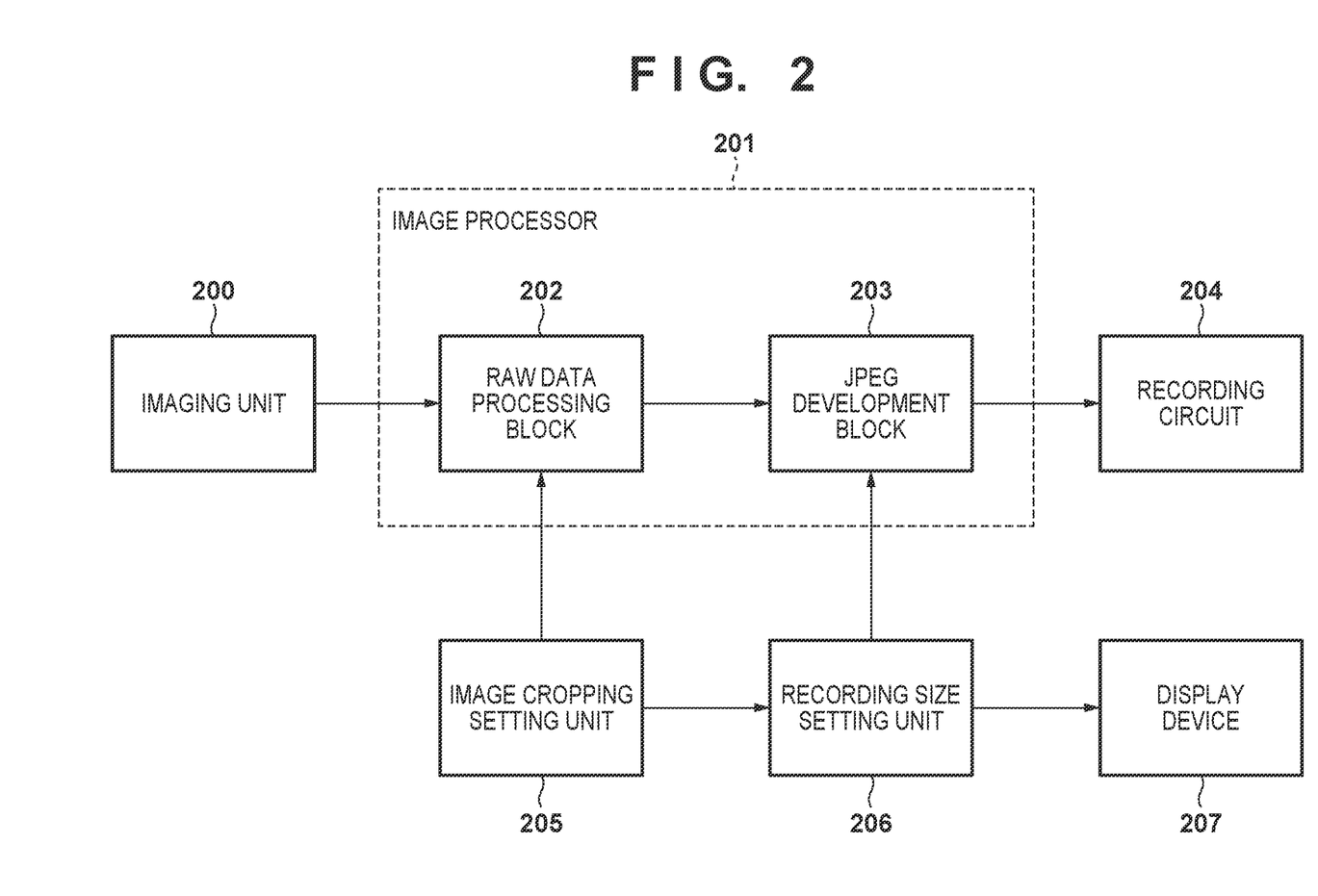
FIG. 2 is a block diagram showing a part of a functional configuration of the digital camera according to a first embodiment.

FIG. 2 is a block diagram showing a part of a functional configuration of the digital camera shown in FIGS. 1A to 1C. An imaging unit 200 includes the image sensor 103. Upon shooting being performed, image signals read out from the imaging unit 200 are transferred to a RAW data processing block 202 in the image processor 201. In the RAW data processing block 202, image data is subjected to various corrections, the sensitivity is increased using digital gain, and/or the white balance is adjusted. If a cropping mode is set through an image cropping setting unit 205, processing to crop a portion of a RAW image is performed.

Note that the cropping mode refers to a mode of performing processing (cropping processing) to narrow the angle of view by means of cropping or trimming, and can be set by the user using the image cropping setting unit 205. Although the cropping processing in this embodiment is described as processing to read out image signals from all of the pixels in the image sensor 103 and extract some of these image signals, control may alternatively be performed to read out image signals from pixels in a predetermined partial region out of the pixels in the image sensor 103. In any case, an image with an angle of view that is narrower than that of an image obtained with all pixels in the image sensor 103 is obtained due to the cropping processing. In the alternative case, setting information from the image cropping setting unit 205 may be supplied to the imaging unit 200 instead of the RAW data processing block 202.

In the following description, in the case of an L-size image, image signals are read out without thinning out or adding the image signals from respective pixels at least in a region of the image sensor 103 that corresponds to the image, regardless of whether or not the cropping processing is performed.

RAW image data that has been processed by the RAW data processing block 202 is sent to a JPEG development block 203, and is subjected to various kinds of image processing, such as conversion to the YUV format, noise reduction, color space conversion, and JPEG compression. At this time, resizing processing is performed if a recording size other than the L size has been set from a recording size setting unit 206. Lastly, the image data that has been converted to the JPEG format is stored in the recording medium by a recording circuit 204. A display device 207 includes the electronic view finder 105 and the back LCD 109, and displays a live view image, a shot image, and menus for setting the recording size and a cropping mode. Note that the RAW data processing block 202, the JPEG development block 203, the image cropping setting unit 205, and the recording size setting unit 206 refer to some of the functions of a computer, such as a CPU, that are expressed as blocks. Processing of these blocks is performed as a result of the computer, such as a CPU, executing processing programs stored in a memory. Alternatively, some or all of these blocks may be configured as hardware using dedicated logic circuits and/or memories.

Figure 3A:
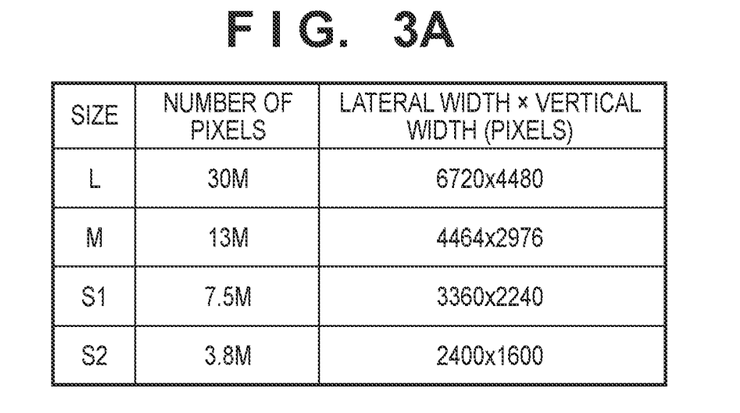
FIGS. 3A and 3B show examples of recording sizes according to the first embodiment.
Figure 3B:
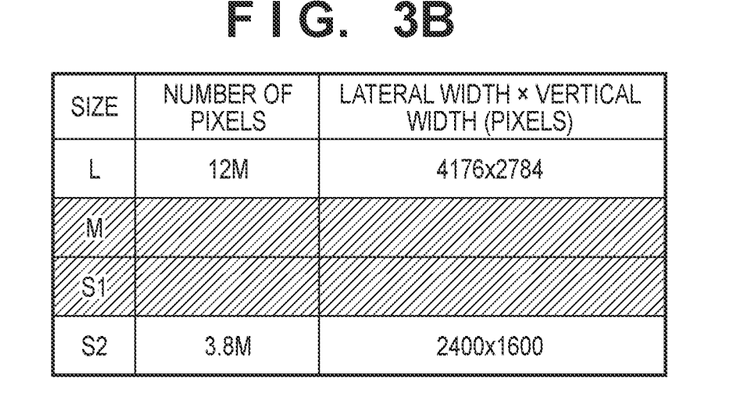

FIGS. 3A and 3B show lists of recording sizes according to this embodiment. FIG. 3A shows a list of recording sizes in a normal shooting mode (i.e. in the case of a mode other than the cropping mode). The L side is a size for recording data of 30 M pixels, which is the same as the number of pixels in the image sensor 103 (reduction ratio=1). The specific recording size is 6720 pixels for the lateral width× 4480 pixels for the vertical width. The M size is a size obtained by reducing the L size to approximately two-thirds (reduction ratio=2/3). The vertical width, if simply calculated, is 4480÷3×2=2986.666 . . . pixels, but the number of pixels needs to be a multiple of 16 pixels due to a processing constraint of the JPEG development block 203. Thus, the vertical width is 2976 pixels by rounding down the aforementioned value to a multiple of 16. Since the aspect ratio of the image is 3:2, the lateral width is 2976÷2×3=4464 pixels. The S1 size, which is a size obtained by halving the L size, has a vertical width of 4480÷2=2240 pixels (reduction ratio=1/2). Since the aspect ratio of the image is 3:2, the lateral width is 2240÷2×3=3360 pixels. The S2 size, which is fixed irrespective of the number of pixels, has a lateral width of 2400 pixels and a vertical width of 1600 pixels.

FIG. 3B shows a list of recording sizes in the case where the cropping mode is set. In this embodiment, the number of pixels of the L size of an image whose angle of view has been changed through the cropping processing is 12 M. In this case, as a specific recording size, the L size has a lateral width of 4176 pixels and a vertical width of 2784 pixels. The M size, which is a size obtained by reducing the L size to approximately two-thirds, has a lateral width of 1856÷2× 3=2784 pixels and a vertical width of 2784÷3×2=1856 pixels. The S1 size, which is a size obtained by halving the L size, has a lateral width of 1392÷2×3=2088 and a vertical width of 2784÷2=1392. However, since the image size needs to be a multiple of 16, the lateral width is 2080, which is obtained by rounding down the aforementioned value to a multiple of 16.

In this case, the S1 size is smaller than the S2 size in the normal shooting mode. In the first embodiment, a predetermined threshold is provided for the number of pixels, and a size that is smaller than the threshold cannot be selected if the cropping mode is set. As an example, if the threshold is 1.5 times the number of pixels of the S2 size, a size smaller than 2400×1600×1.5=5.76 M cannot be selected. However, the method of determining the threshold is not limited thereto, and the threshold may be obtained by multiplying the number of pixels of the S2 size by n, where n is an arbitrary value of 1 or more, or by adding 1 or more to the number of pixels of the S2 size. Alternatively, the number of pixels itself of the S2 size may be used as the threshold. However, it is desirable that this value is 1 or greater. Although, in this embodiment, the threshold is calculated based on the S2 size, it may alternatively be calculated based on the L size. Furthermore, a predetermined number of pixels may be used as the threshold.

If the threshold is 5.76 M as mentioned above, the M size is 2784×1856=5.17 M, and is therefore rendered unsettable. The S1 size, whose number of pixels is smaller than that of the M size, is similarly rendered unsettable. Thus, if the cropping mode is set, only the L size, which has a number of pixels greater than the threshold, and the S2 size are settable sizes.

Although, in the above example, the number of pixels of the L size when the cropping mode is set is 12 M, this may not be the case, and the number of pixels may be selected from a plurality of predetermined numbers of pixels, or a user may designate any number of pixels. Also, various methods for designating the number of pixels are conceivable; for example, the number of pixels may be directly designated, or a ratio of the number of pixels to the number of all pixels in the image sensor may be designated, or a frame that indicates a region to be cropped may be displayed on the display device.

Figure 4:
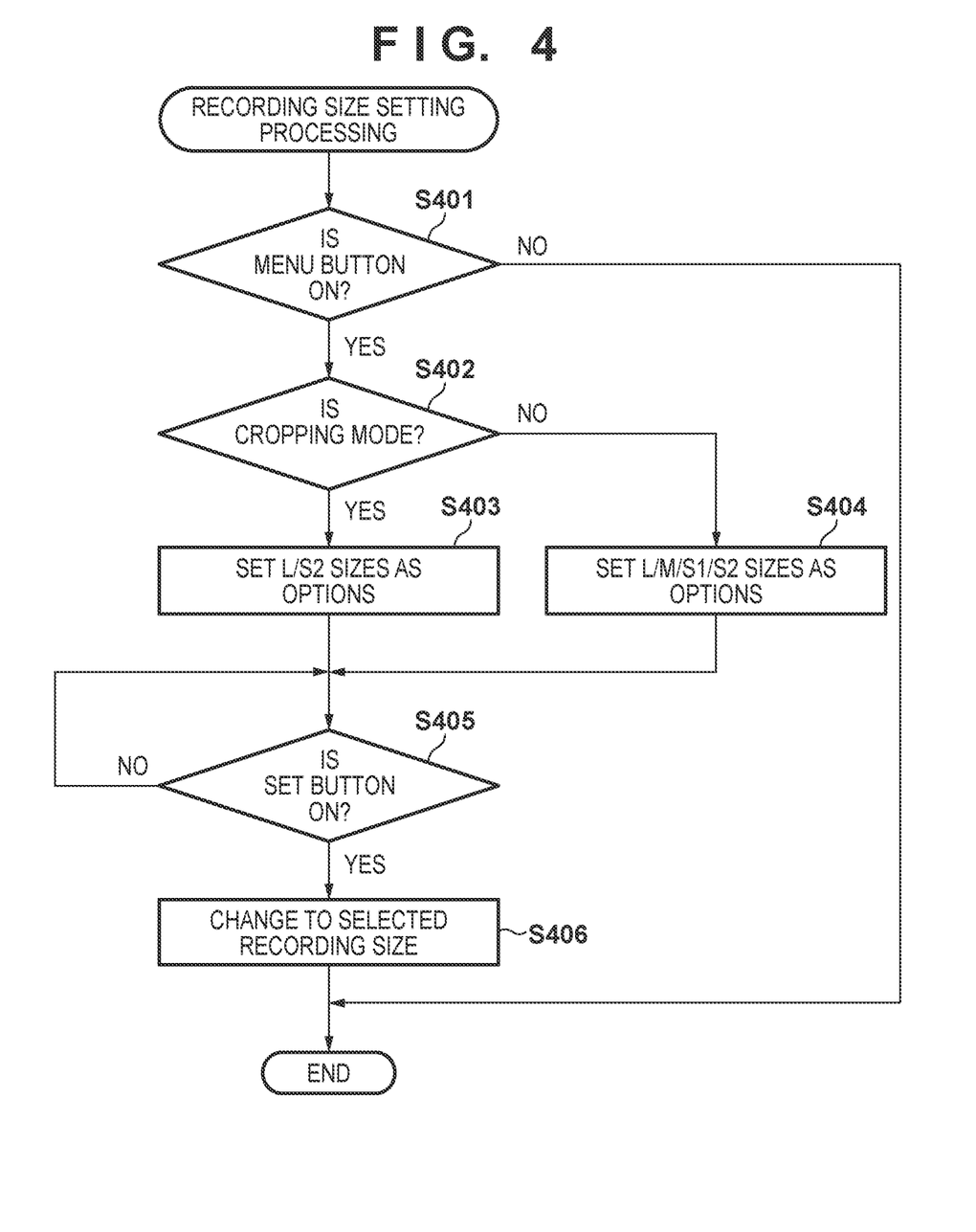
FIG. 4 is a flowchart of recording size setting processing according to the first embodiment.

Next, processing performed by the recording size setting unit 206 will be described using FIG. 4. FIG. 4 is a flowchart showing recording size setting processing according to the first embodiment. Initially, whether or not the menu display button 106 has been pressed is determined (S401), and if pressed, in step S402, whether or not the cropping mode has been set (or whether or not the angle of view has been changed) by the image cropping setting unit 205 is determined. If it is determined that the cropping mode has been set, in step S403, the L size and the S2 size are set as recording size options in the above example, and are displayed on the display device 207. On the other hand, if it is determined in step S402 that the cropping mode has not been set, in step S404, all recording sizes (L size, M size, S1 size, and S2 size) are set as recording size options, and are selectably displayed on the display device 207. The user can determine the recording size by selecting a desired recording size using the four-direction button 107 and pressing the set button 108. Whether or not the set button 108 has been pressed is determined (S405), and if pressed, in step S406, the recording size is changed to the selected one, and the recording size setting processing ends.

Although this embodiment has described the case where the recording size options in the cropping mode in step S403 are predetermined as the L size and the S2 size, the recording sizes may be calculated and subjected to determination using the threshold during the processing in step S403.

Figure 5A:
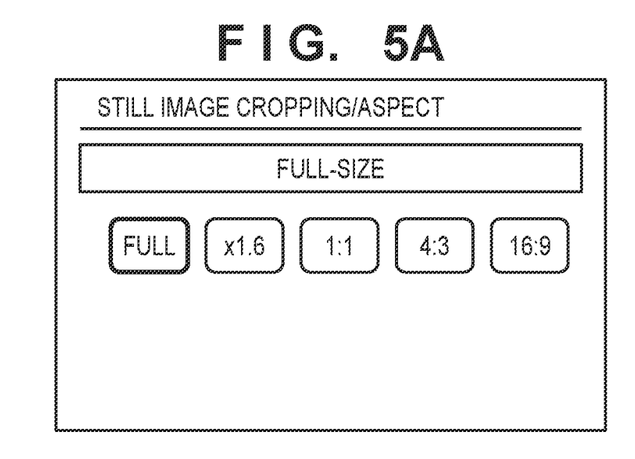
FIGS. 5A to 5D show a cropping mode setting menu and a recording size setting menu according to the first embodiment.
Figure 5B:
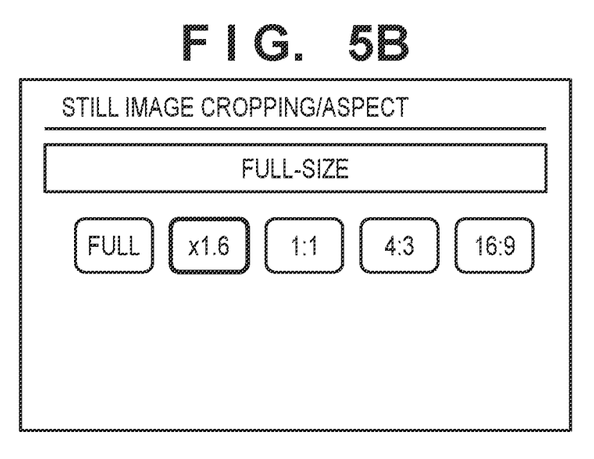

FIGS. 5A and 5B show examples of screens that are displayed if the menu display button 106 is pressed in step S401. In a state where the cropping mode is not set, a menu shown in FIG. 5A is displayed on the display device 207, and the user can select the cropping mode. Note that FIGS. 5A and 5B show a configuration of the menu in which the cropping mode and the aspect ratio are set at the same time. "FULL" indicates 3:2, which is the aspect ratio of the image sensor 103, "×1.6" indicates the cropping mode, and 1:1, 4:3, and 16:9 are aspect ratios.

Figure 5C:
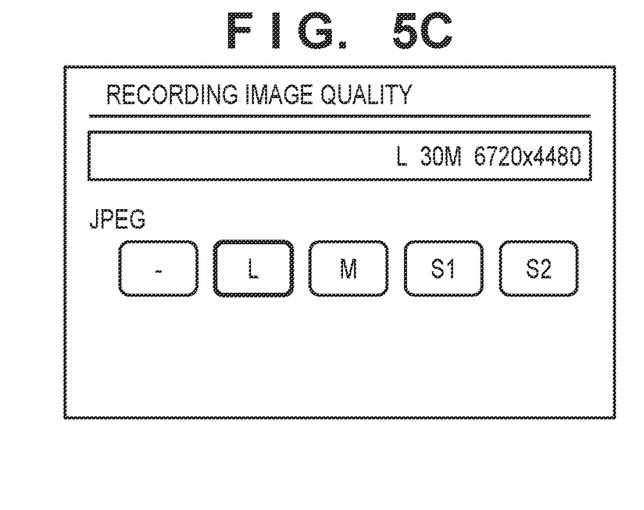

If "FULL" is selected (i.e. the cropping mode is not set) as shown in FIG. 5A, in step S404, a recording size setting menu shown in FIG. 5C is displayed on the display device 207. The user can select the recording size for JPEG from the L size, the M size, the S1 size, and the S2 size. In the case where RAW images can be stored, a setting can also be configured to not store JPEG images.

Figure 5D:
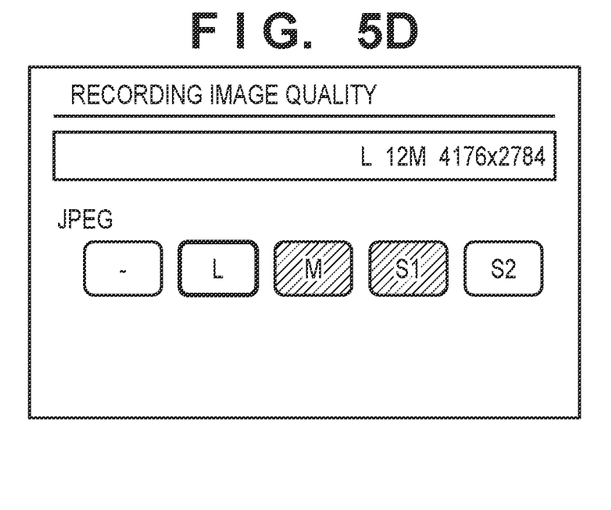

On the other hand, if "×1.6" is selected (i.e. the cropping mode is set) as shown in FIG. 5B, in step S403, a recording size setting menu shown in FIG. 5D is displayed on the display device 207, and the user cannot select the M size and the S1 size. For example, the M size and the S1 size are displayed with a color or brightness that is different from that of the L size and the S2 size, or are not displayed, and thus the user is notified that the M size and the S1 size cannot be selected. Note that the number of pixels of the selected recording size is also displayed in FIGS. 5C and 5D. Thus, even if the number of pixels of the L size has been changed as a result of the angle of view being narrowed due to the cropping mode, the user can check the number of pixels to be recorded in the cropping mode.

As described above, according to the first embodiment, settable recording sizes are controlled in accordance with the setting of the cropping mode, thereby providing a menu that can be readily understood by the user, and the user can select a favorable recording size regardless of the difference in the largest size of the image.

Second Embodiment

Next, the second embodiment of the present invention will be described. Note that the external appearance of the digital camera according to the second embodiment is similar to that described in the first embodiment with reference to FIGS. 1A to 1C, and a description thereof will be omitted accordingly. In the second embodiment, however, an interchangeable lens for a sensor of the APS-C size can also be attached to the lens mount 102 via an adapter, in addition to an interchangeable lens for a full-size sensor.

Figure 6:
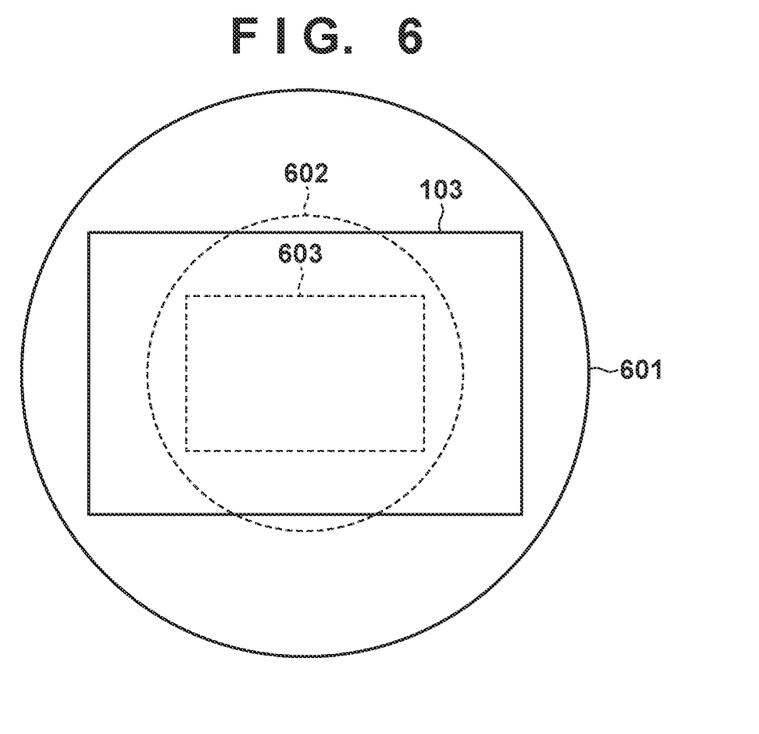
FIG. 6 is a conceptual diagram showing a relationship between an image sensor and image circles according to a second embodiment.

FIG. 6 is a conceptual diagram showing a relationship between the image sensor 103 and image circles according to the second embodiment. An image circle 601 depicts an image circle that is formed when an interchangeable lens for a full-size sensor is attached. The image circle 601 is formed outside the image sensor 103, and light reaches the entire image sensor 103. Meanwhile, an image circle 602 depicts an image circle formed when an interchangeable lens for an APS-C sensor is attached. Since the image circle 602 is formed within the image sensor 103, light does not reach the entire image sensor 103, but reaches only a part of the image sensor 103. For this reason, if shooting is performed in the normal shooting mode, a still image in which a peripheral region is dark is obtained.

On the other hand, if an imaging region 603 that is to be recorded in the cropping mode includes 12 M pixels and has a size of 4176 pixels for the lateral width×2784 pixels for the vertical width as described in the first embodiment, the imaging region 603 is within the image circle 602. Thus, if shooting is performed in the cropping mode, a still image is obtained with light reaching the entirety thereof. Accordingly, when an interchangeable lens for an APS-C sensor is attached, a still image can be obtained with light reaching the entirety thereof by automatically switching the shooting mode to the cropping mode.

Here, if the M size or the S1 size is set when the shooting mode is automatically switched to the cropping mode, the image size also needs to be automatically switched as described in the first embodiment. Since the initial value of the recording size is usually the L size, the L size may be set as the initial value when the shooting mode is automatically switched. However, if the user has selected the S1 size or the S2 size, it is conceivable that the user gives priority to the number of storable images rather than the resolution, and it is highly likely that setting the L size when the shooting mode is switched to the cropping mode is inconsistent with the user's intention. In the second embodiment, the image size is automatically changed to a favorable size when the shooting mode is automatically switched to the cropping mode.

Figure 7:
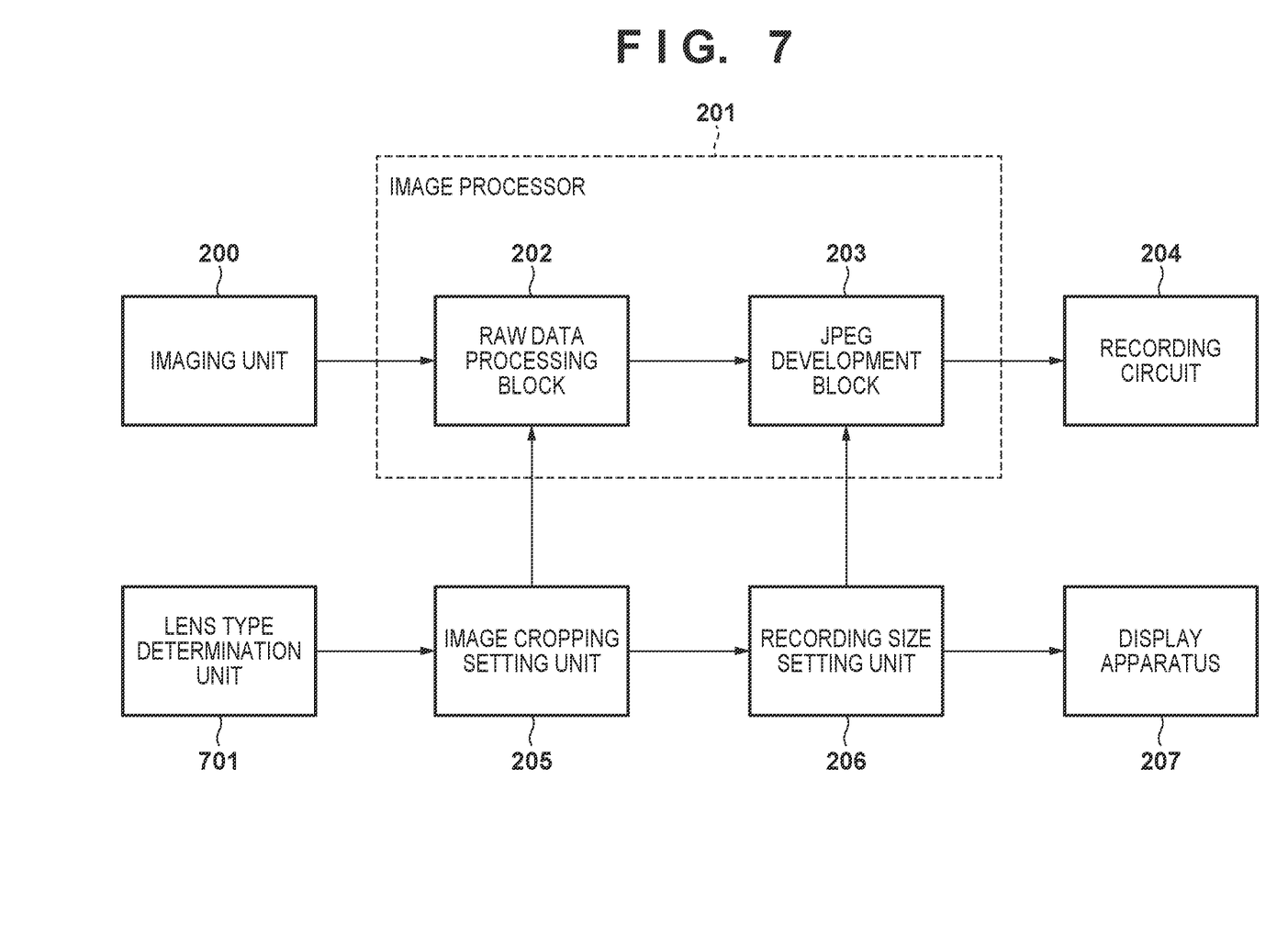
FIG. 7 is a block diagram showing a part of a functional configuration of the digital camera according to the second embodiment.

FIG. 7 is a block diagram showing a part of a functional configuration of the digital camera according to the second embodiment, and shows a configuration in which a lens type determination unit 701 is added to the configuration shown in FIG. 2. The functional configuration of the digital camera according to the second embodiment is the same as the configuration shown in FIG. 2 except for the lens type determination unit 701, and the same units/blocks are assigned the same reference numerals and are not described accordingly.

The lens type determination unit 701 acquires the size of the image circle of the lens that is attached to the lens mount 102, determines whether or not the attached lens is a lens with which shooting is to be performed in the cropping mode, and notifies the image cropping setting unit 205 of the determination result. The image cropping setting unit 205 sets the cropping mode if it is determined that the attached lens is a lens with which shooting is to be performed in the cropping mode, and notifies the recording size setting unit 206 of the setting result. The recording size setting unit 206, upon receiving the notification that the cropping mode has been set from the image cropping setting unit 205, performs recording size change processing and sets the recording size. Note that, in the second embodiment as well, the recording sizes in the normal shooting mode and the cropping mode are those shown in the tables in FIGS. 3A and 3B.

Figure 8:
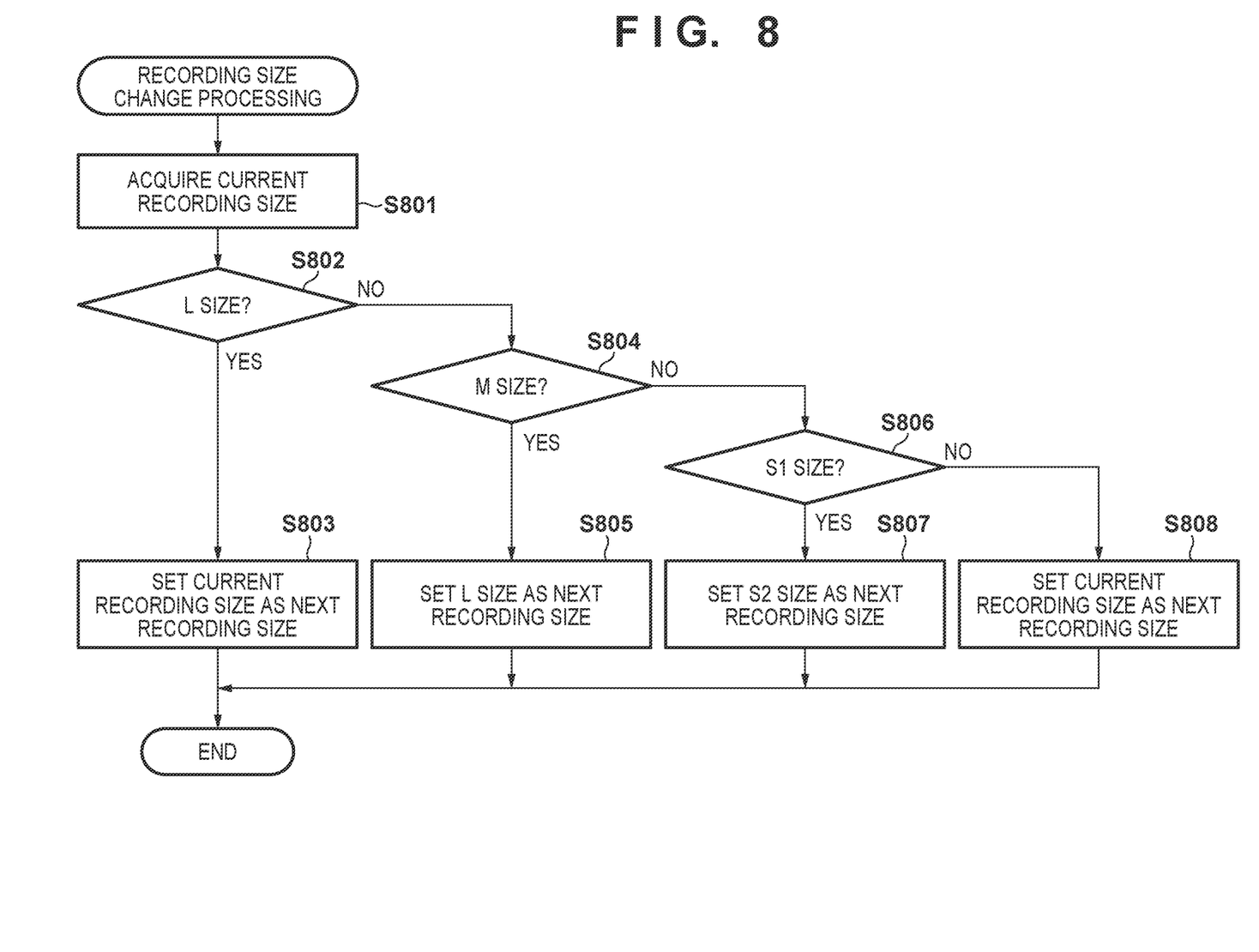
FIG. 8 is a flowchart of recording size change processing according to the second embodiment.

FIG. 8 is a flowchart of the recording size change processing according to the second embodiment. Initially, in step S801, the current recording size is acquired. Next, in step S802, whether or not the current recording size is the L size is determined. If the current recording size is the L size, in step S803, the current recording size is set as the next recording size, and the recording size change processing ends. If, in step S802, the current recording size is not the L size, in step S804, whether or not the current recording size is the M size is determined. If the current recording size is the M size, in step S805, the L size is set as the next recording size, and the recording size change processing ends. If, in step S804, the current recording size is not the M size, in step S806, whether or not the current recording size is the S1 size is determined. If the current recording size is S1 size, in step S807, the S2 size is set as the next recording size, and the recording size change processing ends. If, in step S806, the current recording size is not the S1 size, in step S808, the S2 size, which is the current recording size, is set as the next recording size, and the recording size change processing ends.

An image size can be set in accordance with the user's intention by thus changing the recording size when the shooting mode is switched to the cropping mode, in accordance with the recording size that was set when an interchangeable lens for a full-size sensor was attached. That is to say, when the M size is set, the recording size is changed to the L size when in the cropping mode to give priority to the resolution, and when the S1 size is set, the recording size is changed to the S2 size to give priority to the number of recordable images.

Note that the recording size change processing may be performed not only when a lens is attached but also when the user switches the shooting mode from the cropping mode. Furthermore, control may be performed such that the image size that is set when the cropping mode is not set is stored, and the stored image size is set when the cropping mode is canceled.

According to the second embodiment, an image can be recorded with a favorable recording size even if the cropping mode is automatically set.

Note that the above-described first and second embodiments have described the case where an L-size image is read out, and then resizing processing is performed by the JPEG development block 203 in accordance with a set recording size (reduction ratio). However, an image of a set recording size may alternatively be read out while thinning out or adding image signals from pixels in a region that corresponds to an angle of view that is set by the image cropping setting unit 205, in accordance with the recording size (reduction ratio). In this case, information from the recording size setting unit 206 may be supplied to the imaging unit 200, rather than the JPEG development block 203.

Although the above-described first and second embodiments have described an example of a configuration in which the recording size is selected by operating the digital camera, this may not be the case. A configuration may alternatively be employed in which the recording size is selected using an image processing apparatus such as a PC, a smartphone, or a portable tablet terminal that can remotely control the digital camera by communicating therewith.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-122356, filed on Jun. 27, 2018 which is hereby incorporated by reference herein in its entirety.

What is claimed is:

1. An image processing apparatus comprising:
a processor capable of setting a first mode of outputting image data corresponding to a first region of an image sensor including a plurality of pixels, and a second mode of outputting image data corresponding to a second region that is smaller than the first region, and selecting one of a plurality of sizes at least including a first size, a second size, and a third size, as an output size for image data,
wherein
if the first mode is set, the first size, the second size, and the third size are included as choices of size from which the processor selects, and if the second mode is set, the first size and the third size, excluding the second size, are included as the choices of size,
if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected,
if the second mode is set, image data output in a case where the third size is selected is image data obtained by reducing a number of pixels of image data output in a case where the first size is selected,
a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

2. The image processing apparatus according to claim 1, wherein the predetermined number of pixels is one of a value equal to the number of pixels of image data when the third size is selected, a value obtained by multiplying the number of pixels of image data in a case where the third size is selected by a value of 1 or more, and a value obtained by adding a value of 1 or more to the number of pixels of image data when the third size is selected.

3. The image processing apparatus according to claim 1, wherein the plurality of sizes further include a fourth size, and if the first mode is set, image data output in a case where the fourth size is selected is reduced image data such that a number of pixels thereof is smaller than that of image data output in a case where the second size is selected, and is greater than that of image data output in a case where the third size is selected.

4. The image processing apparatus according to claim 3, wherein, in a case where the first mode is changed to the second mode, if the second size is selected in the first mode, the processor selects the first size in the second mode, and if the fourth size is selected in the first mode, the processor selects the third size in the second mode.

5. The image processing apparatus according to claim 1, wherein the processor selects one of the first mode and the second mode in accordance with a lens used to capture an image.

6. The image processing apparatus according to claim 5, wherein the processor sets the second mode if some of effective pixels in the image sensor are not included in an area of an image circle of the lens used to capture an image.

7. The image processing apparatus according to claim 6, wherein the processor sets the first mode if all of the effective pixels in the image sensor are included in the area of the image circle of the lens used to capture an image.

8. The image processing apparatus according to claim 5, further comprising:
the image sensor; and
a lens mount to and from which an interchangeable lens is attached and detached.

9. The image processing apparatus according to claim 8, wherein the processor sets the first mode if an image is captured with an interchangeable lens for a full-size sensor attached, and sets the second mode if an image is captured with an interchangeable lens for an APC-S sensor attached.

10. The image processing apparatus according to claim 8, further comprising:

a readout circuit that reads out image data from each of the plurality of pixels in the image sensor,
wherein the processor converts a size of the read image data based on a set mode that is one of the first mode and the second mode, and on a size selected from the plurality of sizes.

11. The image processing apparatus according to claim 8, wherein the processor has a readout circuit that reads out image data from each pixel in an area corresponding to a set mode that is one of the first mode and the second mode, of the plurality of pixels in the image sensor, and the processor converts a size of the read image data based on a size selected from the plurality of sizes.

12. An image processing method comprising:
selecting one of a plurality of sizes at least including a first size, a second size, and a third size, as an output size for image data, while it is possible to set a first mode of reading out image data corresponding to a first region of an image sensor including a plurality of pixels, and a second mode of reading out image data corresponding to a second region that is smaller than the first region, wherein if the first mode is set, the first size, the second size, and the third size are included as choices of size from which a size is selected, and if the second mode is set, the first size and the third size, excluding the second size, are included as the choices of size, if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected, if the second mode is set, image data output in a case where the third size is selected is image data obtained by reducing a number of pixels of image data output in a case where the first size is selected, a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

13. A non-transitory storage medium readable by a computer, the storage medium storing a program that is executable by the computer, wherein the program includes program code for causing the computer to function as an image processing apparatus comprising:

selecting one of a plurality of sizes at least including a first size, a second size, and a third size, as an output size for image data, while it is possible to set a first mode of reading out image data corresponding to a first region of an image sensor including a plurality of pixels, and a second mode of reading out image data corresponding to a second region that is smaller than the first region, wherein if the first mode is set, the first size, the second size, and the third size are included as choices of size from which a size is selected, and if the second mode is set, the first size and the third size, excluding the second size, are included as the choices of size, if the first mode is set, image data output in a case where the second size is selected is image data that is obtained by reducing a number of pixels, by a first ratio, of image data output in a case where the first size is selected, and image data output in a case where the third size is selected is image data obtained by reducing a number of pixels of image data output in a case where the second size is selected, if the second mode is set, image data output in a case where the third size is selected is image data obtained by reducing a number of pixels of image data output in a case where the first size is selected, a number of pixels of image data in a case where the second mode is set and the third size is selected is equal to a number of pixels of image data in a case where the first mode is set and the third size is selected, the number of pixels of image data in a case where the second mode is set and the first size is selected is smaller than the number of pixels of image data in a case where the first mode is set and the first size is selected, a number of pixels obtained by reducing, by the first ratio, the number of pixels of image data in a case where the second mode is set and the first size is selected is smaller than a predetermined number of pixels that is based on the number of pixels of image data in a case where the third size is selected, and the number of pixels of image data in a case where the second mode is set and the first size is selected is greater than or equal to the predetermined number of pixels.

* * * * *